May 24, 1927.  
B. F. SCHMIDT  
1,630,076  
HAND OPERATED GEAR SHIFT MECHANISM  
Filed June 17, 1926    2 Sheets-Sheet 1

INVENTOR  
B. F. Schmidt  
BY  
ATTORNEY

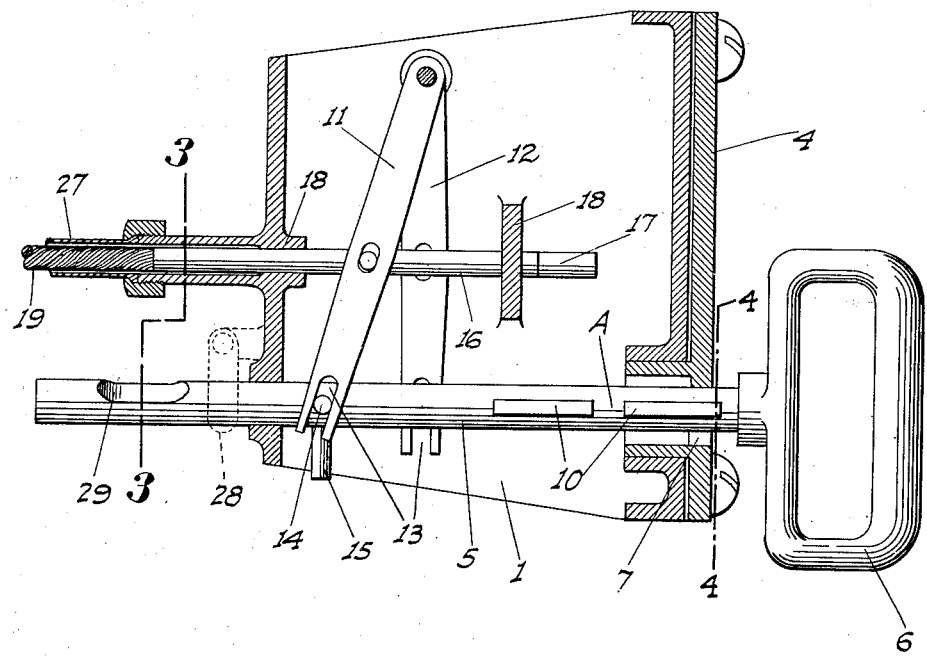
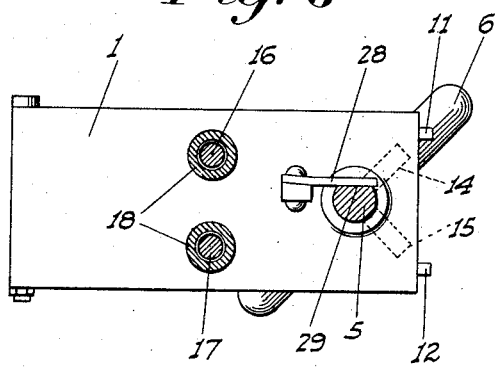
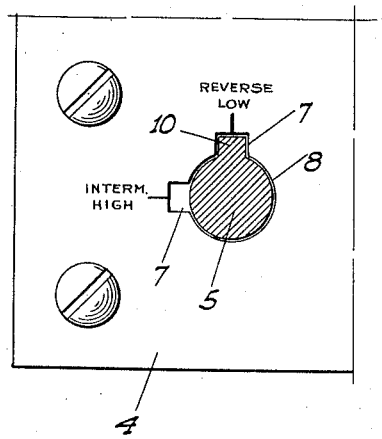

Patented May 24, 1927.

1,630,076

UNITED STATES PATENT OFFICE.

BENJAMIN F. SCHMIDT, OF LOS ANGELES, CALIFORNIA, ASSIGNOR TO GILLETTE SCHMIDT CORPORATION, OF LOS ANGELES, CALIFORNIA, A CORPORATION OF DELAWARE.

HAND-OPERATED GEAR-SHIFT MECHANISM.

Application filed June 17, 1926. Serial No. 116,574.

This invention relates to improvements in means for shifting the transmission gears of motor vehicles, my principal object being to provide an operating structure for the purpose so devised as to eliminate the usual lever upstanding from the floor of the car and leaving the floor of the car, as well as the leg room ahead of the dashboard, entirely clear of any projections.

This apparatus when moutned in connection with the emergency brake operating mechanism set forth in my co-pending application for patent on the same filed June 19th, 1926, Serial No. 117,137, will therefore greatly increase the comfort and convenience of those occupying the driver's compartment of the car, since both devices avoid cutting through the floor of the compartment and allow all the floor space to be utilized for foot or leg room.

A further object of the invention is to provide a gear shifting structure which may be readily applied to standard transmission or gear shift mechanisms and to vehicles already built and in service, and which may be readily operated by anyone conversant with the operation of an ordinary gear shift lever.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a sectional plan of the upper unit of my operating mechanism taken substantially on the line 2—2 of Fig. 1.

Fig. 3 is a front end view of said upper unit looking rearwardly taken on the line 3—3 of Fig. 2, and showing the operating handle in its neutral position.

Fig. 4 is a fragmentary rear end view of said unit looking forward taken on the line 4—4 of Fig. 2.

Figure 1:
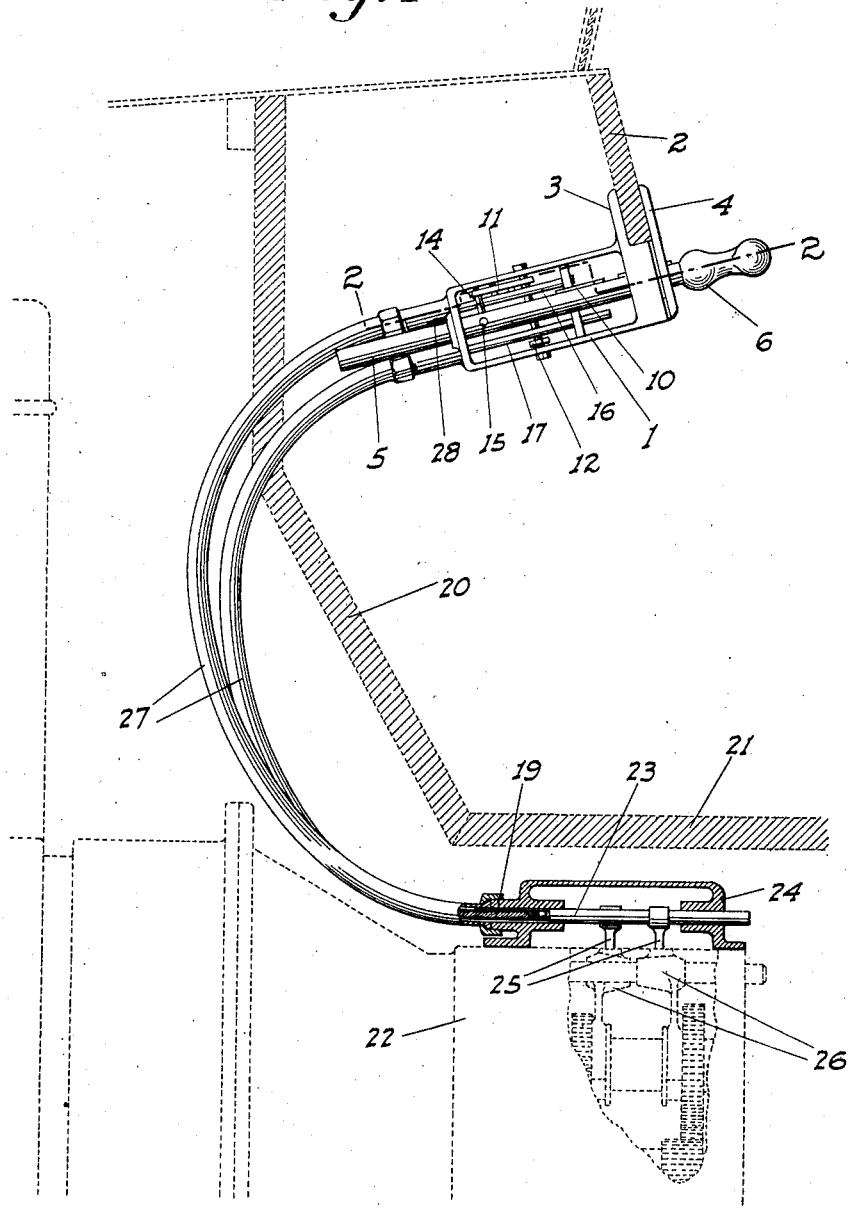
Fig. 1 is a side sectional outline of an ordinary transmission mechanism as arranged in connection with the usual floor and dashboard structure, showing my improved gear shifting mechanism as installed in connection therewith.

Referring now more particularly to the characters of reference on the drawings, the numeral 1 denotes a rigid casing of suitable size and shape adapted to extend forwardly from the dashboard 2. At its rear end this casing preferably has an upwardly extending flange 3 to abut against the dashboard, while a cover plate 4 to cooperate with said flange and the adjacent end of the casing is placed against the rear face of the dashboard. These parts are clamped together and to the dashboard by suitable means so that the casing and plate form a unitary structure when mounted in place and are rigidly held from displacement relative to the dashboard. The casing is substantially horizontally disposed or at right angles to the vertical plane of the dashboard as may be found convenient.

Slidable longitudinally through the casing and plate and bearing in the plate and the forward end of the casing is a shaft 5, on the outer end of which, beyond the plate 4, is an operating handle 6 of suitable form. The plate 4 has a pair of radial notches 7 projecting outwardly from the shaft opening 8 therein, said notches being spaced 90 degrees apart. The notches are of sufficient size to receive longitudinally disposed and alined keys 10 therethrough, said keys being fixed on the shaft 5 and being spaced apart a distance not less than the thickness of the plate 4, as shown at A.

Pivotally mounted at one end in common in the casing to one side of the shaft and straddling the same are levers 11 and 12. The outer ends of the levers are disposed adjacent the shaft and are forked or provided with longitudinal openings as at 13 to receive pins 14 and 15 respectively, which project outwardly and radially from the shaft 5.

These pins are transversely alined with each other and are set 90 degrees apart, or the same as the spacing of the notches 7. Flexibly connected to the arms 11 and 12 intermediate their ends and preferably extending parallel to the shaft 5 are rods 16 and 17 respectively, said rods having suitable bearings 18 in the casing. To the forward ends of these rods are connected flexible but non-extensible cables 19 which extend through the engine bulkhead 20 of the car and then around and under the floor 21 to a rearwardly facing termination adjacent the forward end of the transmission casing 22. At this end the cables are individually connected to longitudinal rods 23 which are slidably mounted in a cover member 24 mounted on the transmission housing. Downwardly projecting lugs or pins 25 on said rods permanently engage the respective slidable gear shifting forks 26 of the transmission structure.

In order to guide and maintain the cables in a definite fixed plane and prevent the buckling of the same when pushed or the straightening out of the same when pulled, said cables are enclosed from end to end in semi-rigid housings 27. These housings have a flexibility sufficient only to enable them to be bent while being installed, so as to avoid immovable or fixed parts of the vehicle, and they are fixed at their opposite ends in a suitable manner onto the casing 1 and the cover 24.

These parts are so arranged that when the space A between the keys 10 alines with the plate 4, so that the shaft 5 can be turned, the levers 11 and 12 and their forked ends are then in transverse and superimposed alinement at right angles to the shaft 5. The pins 14 and 15 on the shaft 5 are then disposed in transverse alinement with the openings 13 so that they are free to enter or leave the same. The cables and the parts in the transmission structure connected thereto are so arranged that when said levers are in the above named position the gear shifting forks are in a neutral position.

The gear shifting fork structure is provided as usual with locking means tending to hold the forks in their neutral or gear engaging positions. In order however to cause the shaft 5 to seek and hold a neutral position irrespective of the shifting fork locks, I preferably mount a flat spring 28 on the casing 1 tangential to the shaft 5 at a suitable point. This spring is adapted to abut against a flat area 29 cut in said shaft only when the shaft has been moved both longitudinally and arcuately to a neutral position, as shown in Fig. 3.

In operation it will be seen that when the shaft 5 is in a neutral position, as above stated, the operator may rotate the handle and consequently the shaft 5 in one direction or the other, so that the pins 14 or 15 may be selectively engaged with the opening 13 of either corresponding lever 11 or 12. The shaft 5 may be then moved straight back or forward to shift the engaged lever one way or the other. At the same time either one or the other of the keys 10 engage one of the notches 7 and prevents rotation of the shaft while such longitudinal movement thereof is being effected. This movement of the shaft and lever of course moves the corresponding cable and rod 23, effecting a gear shifting movement of the corresponding fork 25. While one lever is being shifted it will be obvious that the other will remain stationary in its neutral position, since either lever must first be moved to its neutral position before the pin engaged therewith can be disengaged therefrom and the other pin moved into engagement with the other lever.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a motor vehicle the combination with the dashboard, motor bulkhead and transmission structure under the floor of the vehicle, said structure including a gear shift fork movable longitudinally of the vehicle; a mechanism for moving said fork including a rigid tubular housing extending from ahead of the dashboard through the bulkhead and down under the floor to a termination adjacent the transmission structure in substantial longitudinal alinement with the fork, a flexible element extending through and closely guided by said housing, means operatively connecting the element with the fork, a shaft extending and movable longitudinally of the vehicle, means for supporting said shaft and the adjacent end of the housing from the dashboard, a handle on said shaft to the rear of the dashboard, power increasing means attached to the adjacent end of the element and mounted in said supporting means, and means for operatively connecting the shaft to the power increasing means.

2. In a motor vehicle having a transmission structure which includes a movable gear shift fork, and a dashboard above said structure, a flexible element extending from adjacent said structure to a point adjacent the dashboard, means connecting the lower end of the element to the fork, a handle member mounted in connection with the dashboard, power increasing means mounted in connection with the handle member, and to which the upper end of the element is connected, and means for selectively connecting the handle member to the power increasing means.

3. A gear shift mechanism comprising, with a pair of gear shift forks, flexible members operatively connected at one end to the forks to move the latter with a longitudinal movement of said elements, a fixed casing to which the opposite ends of the elements extend, a single shaft mounted in the casing and arranged for longitudinal movement, a handle on the shaft, a pair of power increasing levers pivoted in common in the casing in a horizontal plane and straddling the shaft, said levers being disposed at an angle to said shaft and to the adjacent ends of the elements and being operatively connected to the latter, radial and circumferentially spaced pins on the shaft, the levers adjacent the shaft having longitudinal openings to alternately receive the pins, means permitting rotation of the shaft to enable a selective engagement of either pin with the corresponding lever-opening to be had only when said levers are positioned relative to each other so that the pins are transversely alined with the said openings, and a rigid tubular housing in which the elements are enclosed and extending from the casing to adjacent the forks.

4. A gear shift mechanism comprising, with a pair of gear shift forks, flexible members operatively connected at one end to the forks to move the latter with a longitudinal movement of said elements, a fixed casing to which the opposite ends of the elements extend, a single shaft mounted in the casing and arranged for rotative and longitudinal movement, a handle on the shaft, a pair of levers pivoted in common in the casing and straddling the shaft, said levers being disposed at an angle to said shaft and to the adjacent ends of the elements and being operatively connected to the latter, radial and circumferentially spaced and transversely alined pins on the shaft, the levers adjacent the shaft having longitudinal openings to receive the pins, and means permitting rotation of the shaft to enable either pin to enter the corresponding lever opening only when the levers are in transverse alinement with each other and at right angles to the shaft and the pins are transversely alined with the lever openings.

5. A gear shift mechanism comprising, with a pair of gear shift forks, flexible members operatively connected at one end to the forks to move the latter with a longitudinal movement of said elements, a fixed casing to which the opposite ends of the elements extend, a single shaft mounted in the casing and arranged for longitudinal movement, a handle on the shaft, a pair of levers pivoted in common in the casing and straddling the shaft, said levers being disposed at an angle to said shaft and to the adjacent ends of the elements and being operatively connected to the latter, radial and circumferentially spaced and transversely alined pins on the shaft, the levers adjacent the shaft having longitudinal openings to receive the pins, a plate provided with the casing having an opening through which the shaft passes, the opening having radial notches having a circumferential spacing the same as that of the pins, and longitudinally alined and spaced keys on the shaft to fit the notches; the space between the keys being not less than the thickness of the plate whereby the shaft may rotate when said space is alined with the plate; the keys being so disposed on the shaft that the openings in the levers are then in transverse alinement with each other and with the pins.

In testimony whereof I affix my signature.

BENJAMIN F. SCHMIDT.